(12) United States Patent
Ortman et al.

(10) Patent No.: US 9,667,872 B2
(45) Date of Patent: May 30, 2017

(54) CAMERA TO CAPTURE MULTIPLE IMAGES AT MULTIPLE FOCUS POSITIONS

(71) Applicant: HEWLETT-PACKARD DEVELOPMENT COMPANY, L.P., Houston, TX (US)

(72) Inventors: John L. Ortman, Westerville, OH (US); Jonathan David Gibson, Austin, TX (US); Ronald Monson, Locust Grove, GA (US); Matthew Stuempfle, Raleigh, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 814 days.

(21) Appl. No.: 13/705,563

(22) Filed: Dec. 5, 2012

(65) Prior Publication Data

US 2014/0152870 A1      Jun. 5, 2014

(51) Int. Cl.
*H04N 5/232* (2006.01)
*H04N 5/262* (2006.01)
*H04N 5/225* (2006.01)

(52) U.S. Cl.
CPC ....... *H04N 5/23296* (2013.01); *H04N 5/2259* (2013.01); *H04N 5/23212* (2013.01); *H04N 5/23293* (2013.01); *H04N 5/2624* (2013.01)

(58) Field of Classification Search
CPC ............... H04N 5/2258; H04N 5/2259; H04N 5/23293; H04N 5/2624; H04N 5/23296; H04N 5/23212

(Continued)

(56) References Cited

U.S. PATENT DOCUMENTS 6,738,073 B2    5/2004  Park et al.
7,443,447 B2 *  10/2008  Shirakawa ................... 348/376
(Continued)

FOREIGN PATENT DOCUMENTS

JP      2007259155 A  * 10/2007
JP      2008298685 A  * 12/2008
(Continued)

OTHER PUBLICATIONS

Yong, Xiao. Single Lens Multi-Ocular Stereovision Using Prism. University of Singapore. 2005.
(Continued)

*Primary Examiner* — John Villecco
(74) *Attorney, Agent, or Firm* — HP Patent Department

(57) ABSTRACT

An example of a camera includes an optical element moving between first and second focus positions upon application of an electrical signal, a sensor capturing first and second images transmitted by the optical element in the respective first and second focus positions, a first storage location recording first images and a second storage location recording second images, and a screen simultaneously displaying a most recent first image from the first storage cation and a most recent second image from the second storage location. Another example of a camera includes the optical element and sensor, as well as a processor to: control timing of application of an electrical signal to the optical element to regulate changing of the optical element between first and second focus positions, synchronize capture by the sensor of first and second images, and control streaming of most recent first and second images for simultaneous viewing.

11 Claims, 4 Drawing Sheets

(58) Field of Classification Search
USPC ...... 348/39, 240.2, 240.3, 266, 267, 333.05, 348/333.11, 333.12, 344, 369
See application file for complete search history.

(56) References Cited

U.S. PATENT DOCUMENTS

| | | | |
|---|---|---|---|
| 7,453,517 B2* | 11/2008 | Fujimoto et al. | 348/374 |
| 7,477,307 B2* | 1/2009 | Suzuki et al. | 348/333.05 |
| 7,684,687 B2* | 3/2010 | Furuya | 348/333.05 |
| 7,725,016 B2 | 5/2010 | Lee et al. | |
| 8,072,486 B2 | 12/2011 | Namba et al. | |
| 8,294,808 B2* | 10/2012 | Caron et al. | 348/344 |
| 8,633,998 B2* | 1/2014 | Hayashi et al. | 348/333.01 |
| 9,204,788 B2* | 12/2015 | Yu | A61B 1/0019 |
| 9,485,407 B2* | 11/2016 | Tsai | G02B 7/36 |
| 2005/0206773 A1* | 9/2005 | Kim et al. | 348/340 |
| 2009/0066833 A1* | 3/2009 | Helwegen et al. | 348/347 |
| 2009/0251482 A1* | 10/2009 | Kondo et al. | 345/589 |
| 2010/0302403 A1* | 12/2010 | Anderson | 348/222.1 |
| 2011/0050963 A1* | 3/2011 | Watabe | 348/240.2 |
| 2011/0234881 A1* | 9/2011 | Wakabayashi et al. | 348/333.05 |
| 2011/0242369 A1* | 10/2011 | Misawa et al. | 348/240.2 |
| 2013/0162759 A1* | 6/2013 | Alakarhu et al. | 348/36 |

FOREIGN PATENT DOCUMENTS

| | | |
|---|---|---|
| JP | 2010141671 A * | 6/2010 |
| WO | WO 2008107713 A1 * | 9/2008 |
| WO | WO-2011050496 | 5/2011 |

OTHER PUBLICATIONS

Lee, et al. Dual camera based wide-view imaging system and real-time image registration algorithm. 11th International Conference on Control, Automation and Systems. Oct. 26-29.

Zhang, et al. Fluidic Zoom-Lens-on-a-Chip with wide Field-of-View Tuning Range, IEEE Photonics Technology Letters, vol. 16. No. 10. Oct. 2004.

* cited by examiner

CAMERA TO CAPTURE MULTIPLE IMAGES AT MULTIPLE FOCUS POSITIONS

BACKGROUND

Consumers appreciate ease of use and value in their electronic devices. They also appreciate new and useful features in their electronic devices. Designers and manufacturers of electronic devices may, therefore, endeavor to create and provide such electronic devices to these consumers.

BRIEF DESCRIPTION OF THE DRAWINGS

The following detailed description references the drawings, wherein.

DETAILED DESCRIPTION

Video cameras require a user of the device to choose a particular view of an area or subject (e.g., a wide-angle view of an area or a narrower view of a single subject). An example is a swim meet where a user may desire to have a video of the entire pool area (from a viewpoint within the stands), but at some points, wants to use the zoom feature of the camera to obtain a close perspective of an individual swimmer. The ability to capture and display both images with a camera, rather than having to choose between one of them, would be a welcome and useful feature.

Commercial video producers (such as TV stations at sporting events or concerts) can use two physically separate cameras controlled by two different operators to achieve this effect. These two feeds are edited either in real-time (with producers and operators) or after the fact. This use of two cameras and subsequent post processing adds expense and complexity to such capture and display of these two different images.

One way in which multiple images may be captured by a single camera for simultaneous display involves the use of two different optical elements that capture and transmit different views of an image (e.g., wide angle and telephoto) to two separate sensors. The use of such two different optical elements and sensors, however, adds to the cost and complexity of such a camera.

Another technique or design may utilize a single optical element with a beam splitter and/or prism element to transmit a first image to a first sensor and a second image to a separate second sensor. However, the use of such beam splitters and/or prism elements along with separate first and second sensors also adds to the cost and complexity associated with the design of such cameras.

Figure 1:
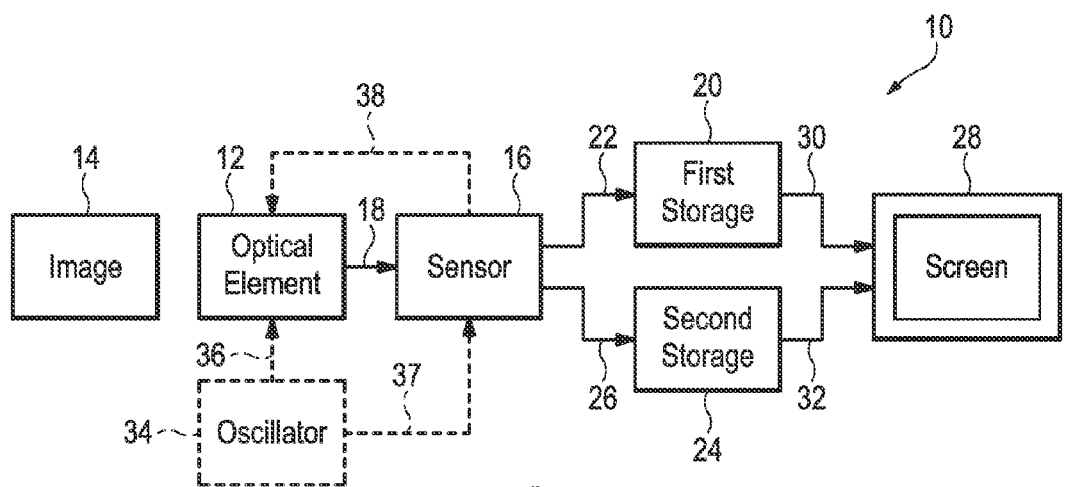
FIG. 1 is an example of a block diagram of a camera.

An example of a block diagram of a camera 10 that is directed to addressing these challenges is illustrated in FIG. 1. As used herein, the term "non-volatile storage medium" is defined as including, but not necessarily limited to, any media that can contain, store, retain, or maintain programs, code, scripts, information, and/or data. A non-volatile storage medium may include any one of many physical media such as, for example, electronic, magnetic, optical, electromagnetic, or semiconductor media. More specific examples of suitable non-volatile storage media include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), a digital video disk (DVD), or a memristor.

As used herein, the term "processor" is defined as including, but not necessarily limited to, an instruction execution system such as a computer/processor based system, an Application Specific Integrated Circuit (ASIC), a computing device, or a hardware and/or software system that can fetch or obtain the logic from a non-volatile storage medium and execute the instructions contained therein. "Processor" can also include any controller, state-machine, microprocessor, cloud-based utility, service or feature, or any other analogue, digital and/or mechanical implementation thereof.

As used herein, the term "camera" is defined as including, but not necessarily limited to, a device that records images in digital, analogue or other format for either subsequent static and/or continuous display, or real-time streaming to, for example, a screen. The images can be visible or invisible (e.g., infrared or ultraviolet). Examples of a "camera" include, but are not necessarily limited to, video recorders, digital cameras, video cameras, projectors, or film-based cameras. The camera can be a separate stand-alone unit or integrated into another device such as a mobile phone, computer, personal digital assistant (PDA) or tablet.

As used herein, the term "optical element" is defined as including, but not necessarily limited to, one or more lens, mirrors, or a combination thereof. The optical element may be made, for example, from glass, liquid, ceramic, semiconductor material, or a combination thereof.

As used herein, the term "sensor" is defined as including, but not necessarily limited to, a Charge Coupled Device (CCD), Complementary Metal-Oxide Semiconductor (CMOS) device, film, light sensitive material, or similar device that captures images transmitted by an optical element. The images may be of any wavelength including, without limitation, both visible and invisible (e.g., infrared or ultraviolet).

As used herein, the term "screen" is defined as including, but not necessarily limited to, a device for displaying multi-dimensional images. Examples include, but are not necessarily limited to, a monitor, a Liquid Crystal Display (LCD), a television screen, a plasma display, a projection surface, a Light Emitting Diode (LED) display, a holographic display, or a Cathode Ray Tube (CRT) display.

As used herein, the term "storage location" is defined as including, but not necessarily limited to, anon-volatile storage medium. As used herein, the term "oscillator" is defined as including, but not necessarily limited to a device and/or circuit that produces a repetitive electrical signal. The electrical signal may be an electrical impulse, such as a varying voltage or a varying current. The electrical signal may also have a variety of shapes including, without limitation, sinusoidal, square, or triangular.

Referring again to FIG. 1, camera 10 includes an optical element 12 that moves between a first focus position and a second focus position upon application of an electrical signal. In this particular example of camera 10, optical element 12 is a liquid lens that provides a wide angle view of image 14 in the first focus position and a telephoto view of image 14 in the second focus position. In other examples, however, first focus position and/or second focus position of optical element 12 may provide different relative views of image 14.

Also in this example of camera 10, the electrical signal that is applied to optical element 12, which causes it to move from the first focus position to the second focus position and from the second focus position to the first focus position, is the same. However, in other examples, the electrical signal that is applied to optical element 12 which causes it to move from the first focus position to the second focus position is different than the electrical signal that is applied which causes optical element 12 to move from the second focus position to the first focus position.

As can be seen in FIG. 1, camera 10 also includes a sensor 16 that captures both first images transmitted by optical element 12 in the first focus position, as generally indicated by arrow 18, and second images transmitted by optical element 12 in the second focus position, as also generally indicated by arrow 18. The rate of capture of the first and second images can vary, as can the rate of application of the electrical signal to move optical element 12 between the first and second focus positions.

As can also be seen in FIG. 1, camera 10 additionally includes a first storage location 20 to record first images captured by sensor 16, as generally indicated by arrow 22, and a second storage location 24 to record second ages captured by sensor 16, as generally indicated by arrow 26. As can additionally be seen in FIG. 1, camera 10 further includes a screen 28 that simultaneously displays a most recent first image retrieved from first storage location 20, as generally indicated by arrow 30, and a most recent second image retrieved from second storage location 24, as generally indicated by arrow 32.

In this example, the first and second images are recorded and stored in respective first storage location 20 and second storage location 24 in a first-in, first-out (FIFO) basis and may be retrieved at any time for either real-time or subsequent display screen 28. They may be recorded and stored in first storage location 20 and/or second storage location 24 differently in other examples. Additionally, one or more of the first and second images may be erased, deleted, or otherwise removed front respective first storage location 20 and second storage location 24 at any time by an end-user of camera 10 either either before or after display on screen 28.

In the example diagram of camera 10 illustrated in FIG. 1, the rate of application of the electrical signal to move optical element 12 between the first and second focus positions is sixty (60) times per second. This allows thirty (30) wide angle first images per second to be captured by sensor 16 when optical element 12 is in the first focus position (one image captured by sensor 16 each time optical element 12 is in the first focus position), stored in first storage location 20, and retrieved from first storage location 20 for display on screen 16. It also allows thirty (30) telephoto second images per second to be captured by sensor 16 when optical element 12 is in the second focus position (one image captured by sensor 16 each time optical element 12 is in the second focus position), stored in second storage location 24, and retrieved from second storage location 24 for simultaneous display on screen 28. This allows high quality video of thirty (30) frames-per-second of image 14 to be taken from two different focal lengths (e.g., wide angle and telephoto) or perspectives (e.g., expansive and close-up) with only one optical element 12 and one sensor 16 of a single camera 10.

This design and configuration of camera 10 saves cost and complexity over using two separate cameras to provide the two different sequences of the first and second images or using two separate optical elements and/or sensors in a single camera to provide the two different sequences of the first and second images. It also saves cost and complexity over other designs by not having to utilize abeam splitter and/or prism to transmit either of the first or second images from optical element 12 to sensor 16.

In other examples of camera 10, the rate of application of the electrical signal to move optical element 12 between the first and second focus positions can be greater than sixty (60) times per second (e.g., one hundred twenty (120) times per second) or less than sixty (60) times per second (e.g., forty eight (48) times per second). Additionally or alternatively, in yet other examples of camera 10, more than one image may be captured by sensor 16 each time optical element 12 is in the first and/or second focus position.

As can further be seen in FIG. 1, in some examples, camera 10 may additionally include an oscillator 34 that controls a timing of application of the electrical signal to optical element 12 to regulate a rate of changing of optical element 12 between the first focus position and the second focus position, as generally indicated by dashed arrow 36. In such examples, oscillator 34 also synchronizes capture by sensor 16 of first images transmitted by optical element 12 in the first focus position and capture by sensor 16 of second images transmitted by optical element 12 in the second focus position, as generally indicated by dashed arrow 37.

As generally indicated by dashed arrow 38 in FIG. 1, in yet some other examples of camera 10, sensor 16 may control timing of the application of the electrical signal to optical element 12 to regulate a rate of changing of optical element 12 between the first and second focus positions. In such examples, oscillator 34 is not required.

Figure 2:
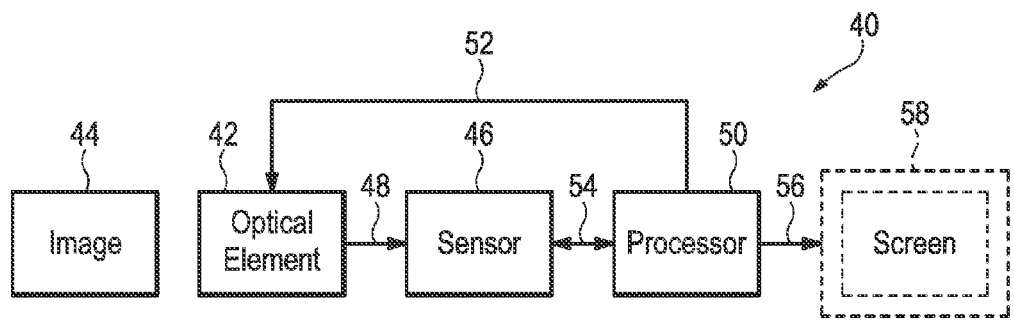
FIG. 2 is another example of a block diagram of a camera.

Another example of a block diagram of a camera 40 is shown in FIG. 2. As can be seen in FIG. 2, in this example, camera 40 includes an optical element 42 that moves between a first focus position and a second focus position upon application of an electrical signal. In this particular example of camera 40, optical element 42 is also a liquid lens that provides a wide angle view of image 44 in the first focus position and a telephoto view of image 44 in the second focus position. In other examples, however, first focus position and/or second focus position of optical element 42 may provide different relative views of image 44.

Also in this example of camera 40, the electrical signal that is applied to optical element 42, which causes it to move from the first focus position to the second focus position and from the second focus position to the first focus position, is the same. However, in other examples, the electrical signal is that is applied to optical element 42 which causes it to move from the first focus position to the second focus position is different than the electrical signal that is applied which causes optical element 42 to move from the second focus position to the first focus position.

As can be seen in FIG. 2, camera 40 also includes a sensor 46 that captures both first images transmitted by optical element 42 in the first focus position, as generally indicated by arrow 48, and second images transmitted by optical element 42 in the second focus position, as also generally indicated by arrow 48. The rate of capture of the first and second images can vary, as can the rate of application of the electrical signal to move optical element 42 between the first and second focus positions.

As can also be seen in FIG. 2, camera 40 additionally includes a processor 50. Processor 50 controls a timing of an application of the electrical signal to optical element 42 to regulate a rate of change of optical element 42 between the first focus position and the second focus position, as generally indicated by arrow 52. Processor 50 also synchronizes capture by sensor 46 of first images transmitted by optical element 42 in the first focus position, as generally indicated by double-headed arrow 54 in FIG. 2, and capture by sensor 46 of second images transmitted by optical element 42 in the second focus position, as also generally indicated by double-headed arrow 54. Processor 50 additionally controls streaming of a most recent first image and a most recent second image for simultaneous viewing, as generally indicated by arrow 56 in FIG. 2.

In the example diagram of camera 40 illustrated in FIG. 2, the rate of application of the electrical signal to move optical element 42 between the first and second focus positions is sixty (60) times per second. This allows thirty (30) wide angle first images per second to be captured by sensor 46 when optical element 42 is in the first focus position (one image captured by sensor 46 each time optical element 42 is in the first focus position) and streamed by processor 50. It also allows thirty (30) telephoto second images per second to be captured by sensor 46 when optical element 42 is in the second focus position (one image captured by sensor 46 each time optical element 42 is in the second focus position.) and streamed by processor 50. This allows high quality video of thirty (30) frames-per-second of image 44 to be taken from two different focal lengths (e.g., wide angle and telephoto) or perspectives (e.g., expansive and close-up) with only one optical element 42 and sensor 46 of a single camera.

This design and configuration of camera 40 saves cost and complexity over using two separate cameras to provide the two different sequences of the first and second images or using two separate optical elements and/or sensors in a single camera to provide the two different sequences of the first and second images. It also saves cost and complexity over other designs by not having to utilize a beam splitter and/or prism to transmit either of the first or second images from optical element 42 to sensor 46.

In other examples of camera 40, the rate of application of the electrical signal to move optical element 42 between the first and second focus positions can be greater than sixty (60) times per second (e.g., one hundred twenty (120) times per second) or less than sixty (60) times per second (e.g., forth eight (48) times per second). Additionally or alternatively, in yet other examples of camera 40, more than one image may be captured by sensor 46 each time optical element 42 is in the first and/or second focus position.

As can further be seen in FIG. 2, in some examples, camera 40 may additionally include a screen 58 coupled to processor 50. Screen 58 is intended to receive the most recent first image streamed by processor 50, as generally indicated by arrow 56, and the most recent second image streamed by processor 50, as also generally indicated by arrow 56, for simultaneous display.

Figure 3:
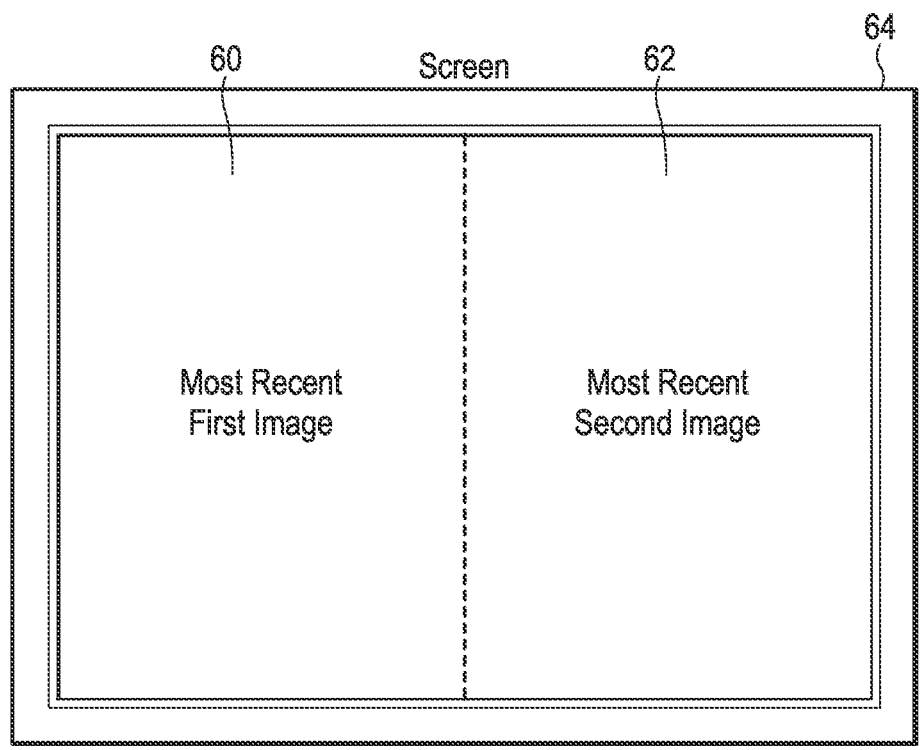
FIG. 3 is an example of simultaneous display of a most recent first image and a most recent second image on a screen.

An example of simultaneous display of a most recent first image 60 and a most recent second image 62 on a screen 64 is shown in FIG. 3. Most recent first image 60 and most recent second image 62 may be provided by either camera 10 or camera 40, as discussed above. Also, screen 64 may represent either screen 28 of FIG. 1 or screen 58 of FIG. 2, as discussed above. Respective most recent first and second images 60 and 62, as well as screen 64, may be utilized as well in other examples of cameras in accordance with this disclosure and following claims.

As can be seen in FIG. 3, in this example, most recent first image 60 and most recent second image 62 are of substantially the same size and are located in a side-by-side orientation. In other examples, however, most recent first image 60 and most recent second image 62 may be of different sizes and/or located in a different orientation. For example, most recent first image 60 may be approximately twice the size of most recent second age 62. As another example, most recent first image 60 may be located on top of most recent second image 62, rather than beside most recent second image 62. These different sizes and/or different orientations may be predetermined and fixed or selectable by an end-user of camera 10, camera 40, or other cameras in accordance with this disclosure and following claims.

Figure 4:
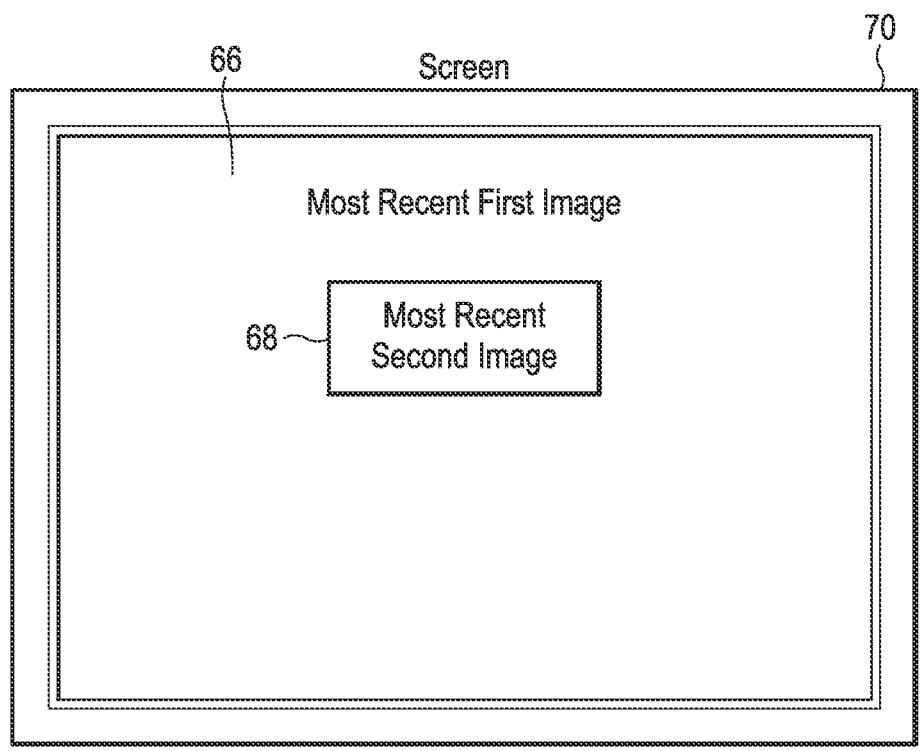
FIG. 4 is another example of simultaneous display of a most recent first image and a most recent second image on a screen.

Another example of simultaneous display of a most recent first image 66 and a most recent second image 68 on a screen 70 is shown in FIG. 4. Most recent first image 66 and most recent second image 68 may be provided by either camera 10 or camera 40, as discussed above. Also, screen 70 may represent either screen 28 of FIG. 1 or screen 58 of FIG. 2, as also discussed above. Respective most recent first and second images 66 and 68, as well as screen 70, may be utilized as well in other examples of cameras in accordance with this disclosure and following claims.

As can be seen in FIG. 4, in this example, most recent first image 66 occupies a first position on screen 70 and most recent second image 68 occupies a second position on screen 70 within the first position on screen 70 occupied by most recent first image 66. The size of most recent second image 68 may be increased or decreased relative to that shown so long as it occupies a second position on screen 70 within the first position on screen 70 occupied by most recent first image 66. Additionally, the size of most recent first image 66 may be decreased relative to that shown.

Figure 5:
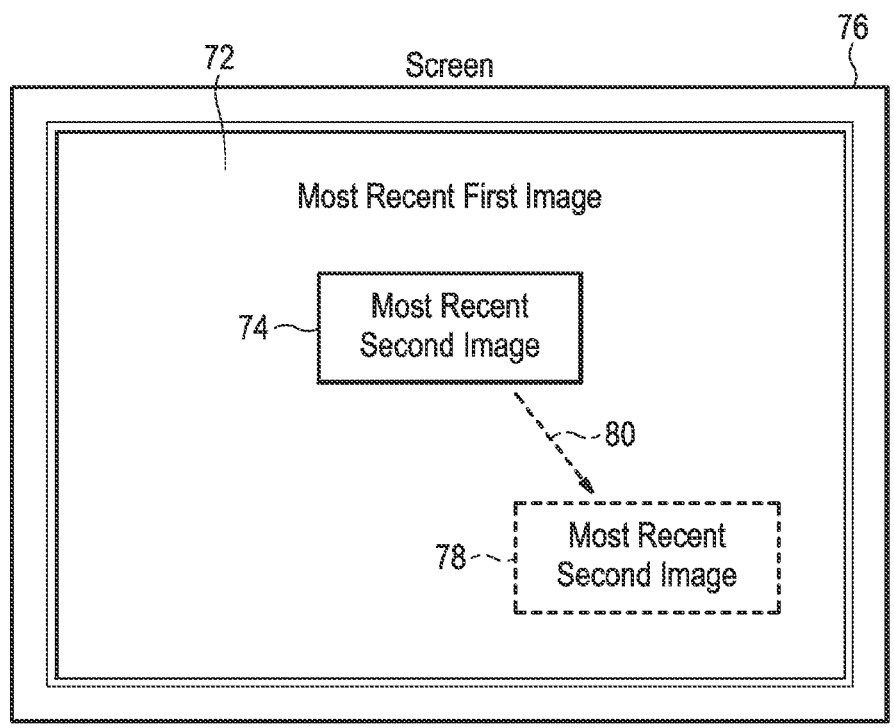
FIG. 5 is an additional example of simultaneous display of a most recent first image and a most recent second image on a screen.

An additional example of simultaneous display of a most recent first image 72 and a most recent second image 74 on a screen 76 is shown in FIG. 5. Most recent first image 72 and most recent second image 74 may be provided by either camera 10 or camera 40, as discussed above. Also, screen 76 may represent either screen 28 of FIG. 1 or screen 58 of FIG. 2, as also discussed above. Respective most recent first and second images 72 and 74, as well as screen 76, may be utilized as well in other examples of cameras in accordance with this disclosure and following claims.

As can be seen in FIG. 5, in this example, most recent first image 72 occupies a first position on screen 76 and most recent second image 74 occupies a second position on screen 76 within the first position on screen 76 occupied by most recent first image 72. As can additionally be seen in FIG. 5, the location of most recent second image 74 within the first position on screen 76 of most recent first image 72 is selectable by an end user of camera 10 or camera 40, as generally indicated by dashed block 78 and dashed arrow 80 in FIG. 5. It is to be understood that in other examples, the location of most recent first image 72 may be selectable as well with respect to most recent second image 74. The size of most recent second image 74 may be increased or decreased relative to that shown so long as it occupies a second position on screen 76 within the first position on screen 76 occupied by most recent first image 72. Additionally, the size of most recent first image 72 may be decreased relative to that shown.

Figure 6:
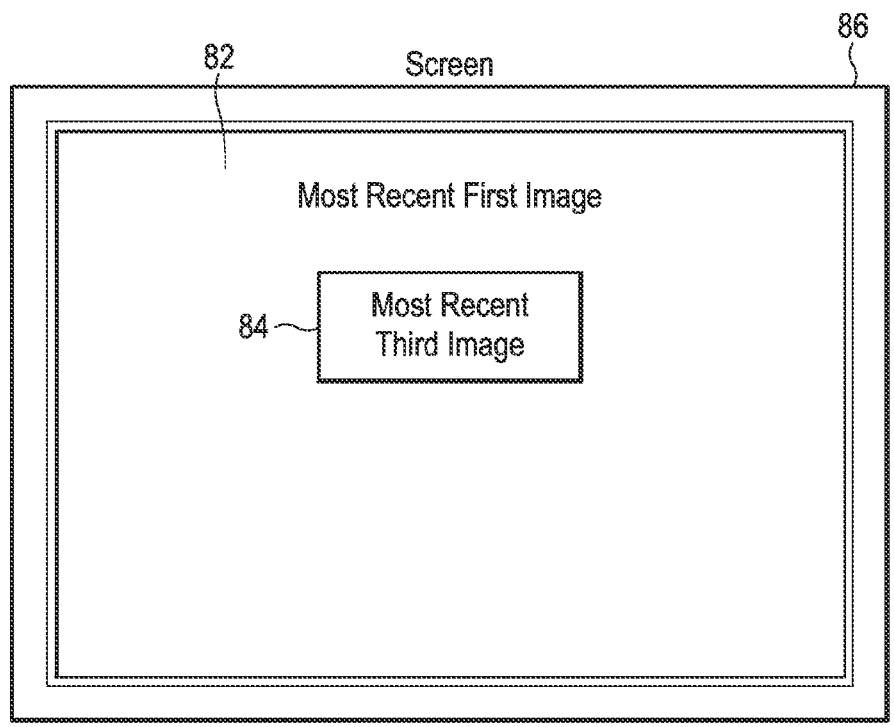
FIG. 6 is an example of simultaneous display of a most recent first image and a most recent third image on a screen.

An example of simultaneous display of a most recent first image 82 and a most recent third image 84 on a screen 86 is shown in FIG. 6. Most recent first image 82 and most recent third image 84 may be provided by either camera 10 or camera 40. More specifically, either or both optical element 12 and/or optical element 42 may assume a third focus position upon application of a different electrical signal and either or both sensor 16 and/or sensor 46 may capture third images transmitted by respective optical element 12 or 42 in this third focus position. These third images may provide a different perspective (e.g., normal view, rather than a wide angle or telephoto view) than either the most recent first images or most recent second images. Also, screen 86 may represent either screen 28 of FIG. 1 or screen 58 of FIG. 2, as also discussed above. Respective most recent first and third images 82 and 84, as well as screen 86, may be utilized as welt in other examples of cameras in accordance with this disclosure and following claims.

As can be seen in FIG. 6, in this example, most recent first image 82 occupies a first position on screen 86 and most recent third image 84 occupies a third position on screen 86 within the first position on screen 86 occupied by most recent first image 82. Although not shown in FIG. 6, it is to be understood that the cation of most recent third image 84 within the first position on screen 86 of most recent first image 82 may be selectable by an end user of camera 10 or camera 40. Additionally, it is to be understood that in other examples, the location of most recent first image 82 may be selectable as well with respect to most recent third image 84. Furthermore, the size of most recent third image 84 may be increased or decreased relative to that shown so long as it occupies a third position on screen 86 within the first position on screen 86 occupied by most recent first image 82. Additionally, the size of most recent first image 82 may be decreased relative to that shown.

Figure 7:
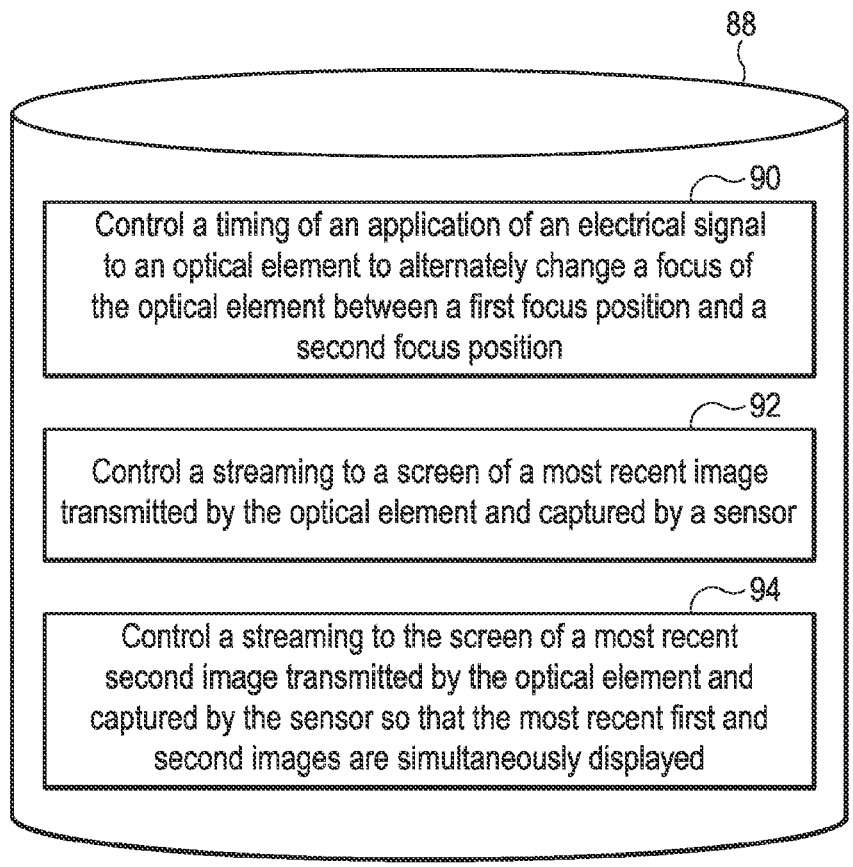
FIG. 7 is an example of a non-volatile storage medium.

An example of a non-volatile storage medium 88 is shown in FIG. 7. As can be seen in FIG. 7, non-volatile storage medium 88 includes instructions that, when executed by a processor (such as processor 50), causes the processor to control a timing of an application of an electrical signal to an optical element to alternately change a focus of the optical element between a first focus position and a second focus position, as generally indicated by block 90. Non-volatile storage medium 88 includes additional instructions that, when executed by the processor, causes the processor to control a streaming to a screen of a most recent image transmitted by the optical element and captured by a sensor, as generally indicated by block 92, and control a streaming to the screen of a most recent second image transmitted by the optical element and captured by the sensor so that the most recent first and second images are simultaneously displayed, as generally indicated by block 94 in FIG. 7.

Figure 8:
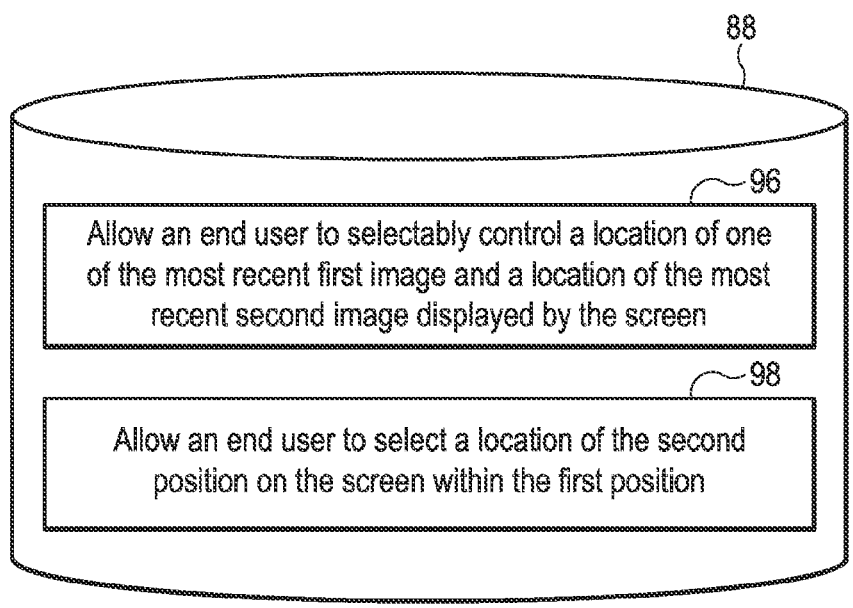
FIG. 8 is an example of additional potential elements of the non-volatile storage medium of FIG. 7.

An example of additional potential elements of non-volatile storage medium 88 is shown in FIG. 8. As can be seen in FIG. 8, non-volatile storage medium 88 may include additional instructions that, when executed by the processor, cause the processor to allow an end user to selectably control a location of one of the most recent first image and a location of the most recent second image displayed by the screen, as generally indicated by block 96 in FIG. 8.

The most recent first image may occupy a first position on the screen and the most recent second image may occupy a second position on the screen within the first position. In such cases, non-volatile storage medium 88 may include additional instructions that, when executed by the processor, cause the processor to allow an end user to select a location of the second position on the screen within the first position, as generally indicated by block 98 in FIG. 8.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, the second focus position of the optical element, the second images transmitted thereby to the sensor, and streamed by the processor and/or displayed on the screen may correspond to a digital zoom of the first image transmitted by the optical element in the first focus position. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A camera, comprising:
   an optical element;
   a sensor both to capture first images transmitted by the optical element in a first focus position and to capture second images transmitted by the optical element in a second focus position;
   a first storage location to record first images captured by the sensor;
   a second storage location to record second images captured by the sensor; and
   a processor to:
      control a timing of an application of an electrical signal to the optical element to alternately change a focus of the optical element between the first focus position and the second focus position;
      synchronize capture by the sensor of first images transmitted by the optical element in the first focus position;
      synchronize capture by the sensor of second images transmitted by the optical element in the second focus position;
      control a streaming to a screen of a most recent first image transmitted by the optical element and captured by the sensor; and
      control a streaming to the screen of a most recent second image transmitted by the optical element and captured by the sensor so that the most recent first and second images are simultaneously displayed.

2. The camera of claim 1, wherein a location of one of the most recent first image and a location of the most recent second image displayed by the screen is selectable by an end user.

3. The camera of claim 1, wherein the optical element assumes a third focus position upon application of a different electrical signal, the sensor captures third images transmitted by the optical element in the third focus position, the processor controls timing of an application of one of the different electrical signal to the optical element to regulate a rate of change of the optical element between the first focus position and the third focus position rather than the first focus position and the second focus position, the processor synchronizes capture by the sensor of the third images transmitted by the optical element in the third focus position, and the screen simultaneously displays the most recent first image streamed by the processor and the most recent third image streamed by the processor in place of the most recent second image.

4. The camera of claim 1, wherein the most recent first image occupies a first position on the screen and the most recent second image occupies a second position on the screen within the first position.

5. The camera of claim 4, wherein a location of the second position on the screen within the first position is selectable.

6. The camera of claim 1, wherein the first and second images are transmitted by the optical element to the sensor independent of use of a beam splitter and further wherein the first and second images are transmitted by the optical element to the sensor independent of use of a prism.

7. The camera of claim 1, wherein the optical element assumes a third focus position upon application of a different electrical signal.

8. A non-transitory, non-volatile storage medium including instruction that, when executed by a processor, cause the processor to:
control a timing of an application of an electrical signal to an optical element to alternately change a focus of the optical element between a first focus position and a second focus position;
control a streaming to a screen of a most recent first image transmitted by the optical element and captured by a sensor;
control a streaming to the screen of a most recent second image transmitted by the optical element and captured by the sensor so that the most recent first and second images are simultaneously displayed.

9. The non-transitory, non-volatile storage medium of claim 8, further comprising additional instructions that, when executed by the processor, cause the processor to allow an end user to selectably control a location of one of the most recent first image and a location of the most recent second image displayed by the screen.

10. The non-transitory, non-volatile storage medium of claim 8, wherein the most recent first image occupies a first position on the screen and the most recent second image occupies a second position on the screen within the first position.

11. The non-transitory, non-volatile storage medium of claim 10, further comprising additional instructions that, when executed by the processor, cause the processor to allow an end user to select a location of the second position on the screen within the first position.

* * * * *